(12) United States Patent
Green et al.

(10) Patent No.: US 8,260,478 B1
(45) Date of Patent: Sep. 4, 2012

(54) ROTATION RATE TRACKING SYSTEM USING GPS HARMONIC SIGNALS

(75) Inventors: Gary B. Green, Center Point, IA (US); Francis Keith Scherrer, Traer, IA (US); James H. Doty, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1138 days.

(21) Appl. No.: 11/879,873

(22) Filed: Jul. 19, 2007

(51) Int. Cl.
*B64G 1/36* (2006.01)

(52) U.S. Cl. .............. 701/13; 701/3; 102/393; 102/374; 102/384; 102/501; 244/3.1; 244/3.16; 244/3.21; 244/3.22; 244/3.23

(58) Field of Classification Search .............. 701/3, 13; 102/393, 374, 384, 501; 244/3.1, 3.16, 3.21, 244/3.22, 3.23; 343/383, 895
See application file for complete search history.

(56) References Cited

U.S. PATENT DOCUMENTS

| | | | | |
|---|---|---|---|---|
| 3,982,714 A * | 9/1976 | Kuhn | | 244/3.16 |
| 4,492,166 A * | 1/1985 | Purcell | | 102/384 |
| 6,279,482 B1 * | 8/2001 | Smith et al. | | 102/374 |
| 6,371,405 B1 * | 4/2002 | Sallee et al. | | 244/3.16 |
| 6,422,507 B1 * | 7/2002 | Lipeles | | 244/3.13 |
| 6,520,448 B1 * | 2/2003 | Doty et al. | | 244/3.23 |
| 6,573,486 B1 * | 6/2003 | Ratkovic et al. | | 244/3.2 |
| 6,587,078 B1 * | 7/2003 | Doty | | 342/383 |
| 6,592,070 B1 * | 7/2003 | Doty | | 244/3.23 |
| 6,695,251 B2 * | 2/2004 | Rodden et al. | | 244/3.21 |
| 6,805,055 B1 * | 10/2004 | Jebsen et al. | | 102/205 |
| 6,825,804 B1 * | 11/2004 | Doty | | 342/357.59 |
| 7,197,381 B2 * | 3/2007 | Sheikh et al. | | 701/13 |
| 7,202,836 B2 * | 4/2007 | Ooi et al. | | 343/895 |
| 7,416,154 B2 * | 8/2008 | Bittle et al. | | 244/3.22 |
| 7,446,291 B1 * | 11/2008 | Bock | | 244/3.1 |
| 7,530,315 B2 * | 5/2009 | Tepera et al. | | 102/393 |
| 7,805,226 B2 * | 9/2010 | Hamilton et al. | | 701/13 |
| 7,849,800 B2 * | 12/2010 | Hinsdale et al. | | 102/501 |
| 7,872,215 B2 * | 1/2011 | Blackburn | | 244/3.22 |

* cited by examiner

*Primary Examiner* — Thomas Black
*Assistant Examiner* — Wae Louie
(74) *Attorney, Agent, or Firm* — Donna P. Suchy; Daniel M. Barbieri (57) ABSTRACT

A spin rate tracking system comprising a guidance system suitable for adjusting a flight path of a vehicle based on a spin rate of the vehicle, a signal reception system configured for receiving signal information from a global navigation system wherein a spin rate of the vehicle is derived from a substantially harmonic pattern produced amongst a global navigation signal.

14 Claims, 6 Drawing Sheets

ROTATION RATE TRACKING SYSTEM USING GPS HARMONIC SIGNALS

FIELD OF THE INVENTION

The present invention generally relates to the field of GPS tracking, and more particularly to GPS tracking of vehicle spin rate, such as for artillery guidance technology.

BACKGROUND OF THE INVENTION

In order to increase the effectiveness of modern artillery vehicles and reduce collateral damage, guidance systems are employed to navigate artillery vehicles during travel. After launch of an artillery vehicle, the artillery vehicle may rotate on an axis parallel to the path of travel. Since a spin rate of an artillery vehicle affects the travel of an artillery vehicle, guidance systems utilize spin rate data to guide the vehicle to a desired endpoint.

Conventional guidance systems for artillery vehicles use precalculated aiding data or onboard inertial sensors to determine the vehicle spin rate. Precalculated aiding data utilizes models of flight dynamics to determine the spin rate of a vehicle. A problem associated with precalculated aiding data is potential for large errors associated with the spin rate calculation in off-nominal conditions. Additionally, precalculated aiding data must be customized for each launch configuration.

Inertial sensors utilize systems within a vehicle to determine a spin rate. For instance, inertial sensors may include components within a vehicle housing, such as gyroscopes and accelerometers of the varieties known in the art for determining a vehicle spin rate. However, inertial sensors for determining the spin rate of a vehicle have inherent disadvantages when used in applications such as artillery vehicles. Inertial sensors add weight and volume to the already constrained space of an artillery vehicle. Inertial sensors also suffer from sensitivity to the high g-force and vibration environment found in artillery applications limiting accuracy performance and reliability while complicating system implementation. Further, current methods for obtaining spin rate in artillery vehicles increase the complexity of the vehicle by increasing the number of systems required to determine the spin rate, either internally (e.g., within the vehicle housing) or external to the vehicle.

Doty et al. in U.S. Pat. No. 6,520,488 describes a system to track the rotation angle of a spinning vehicle utilizing GPS. However, this system must be initialized with an estimate of rotation rate to allow a servo to track the roll angle. If the approximate spin rate is not known, the system requires additional time to search for the spin rate or to measure the modulation frequency of the GPS correlator outputs. This requires additional time. In applications with short flight times, such as artillery shell guidance, short acquisition times are critical to performance. A technique to rapidly determine an accurate estimate of rotation rate is needed in these applications.

Consequently, a system, method, and apparatus for accurately measuring the spin rate of a vehicle, while imparting minimal weight and volume restrictions to the vehicle, and reducing the systemic complexity of the vehicle is necessary.

SUMMARY OF THE INVENTION

Accordingly, the present invention is directed to a system, method and apparatus for measuring a spin rate of a vehicle during the vehicle's path to an endpoint. In a first aspect of the present invention, a spin rate tracking system comprises a guidance system suitable for adjusting a flight path of a vehicle based on a spin rate of the vehicle. A spin rate tracking system of the present invention may comprise a receiver configured for receiving navigation signal information such as from a global navigation system. The spin rate tracking system may further include an antenna for receiving signals from a global navigation system. A spin rate of the vehicle may be derived from the harmonics produced in the signals from a global navigation system. Spin rate tracking system may accurately determine the spin rate of a vehicle, while imparting minimal weight and volume restrictions to the vehicle, and reducing the systemic complexity of the vehicle.

In another aspect of the present invention, a method for tracking a spin rate for a vehicle via a global navigation system receiver comprises tracking global navigation system signals. A method for tracking a spin rate for a vehicle may include tracking a plurality of global navigation satellite system sources and operating a channel to acquire a spin rate harmonic. The method of the present invention may further comprise tracking the spin rate harmonic which may be provided to a guidance system of the vehicle.

In yet another aspect of the present invention, an alternative method for deriving a spin rate for a vehicle is provided. A method for tracking a spin rate for a vehicle may include tracking a plurality of global navigation satellite system signals. The method of the present invention may further comprise periodically receiving global navigation system satellite signals according to a particular timing scheme whereby the difference in position information according to the particular timing scheme allows the derivation of a spin rate of a vehicle which may be provided to a guidance system of the vehicle.

In an additional aspect of the present invention, a vehicle with enhanced spin rate tracking comprises a housing, a guidance system within the housing for adjusting the flight path of the vehicle, and an antenna placed on the housing of the vehicle. The vehicle of the present invention may comprise a GPS receiver connected to the antenna for acquiring and tracking GPS satellite signals. A spin rate of the vehicle may be derived from the harmonics produced in the signals received from GPS satellites. The vehicle of the present invention is suitable for accurately determining vehicle spin rate, while imparting minimal weight and volume restrictions and reducing systemic complexity.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
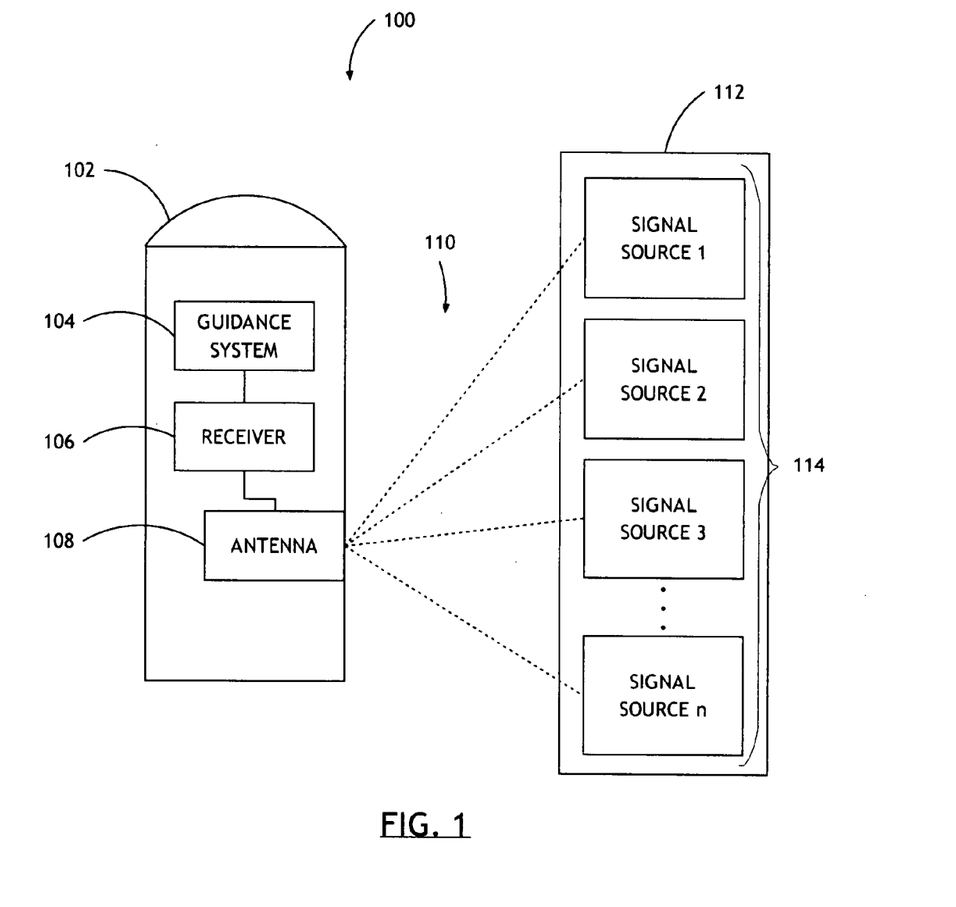
FIG. 1 is a block diagram of a spin rate tracking system in accordance with an exemplary embodiment of the present invention.
Figure 2:
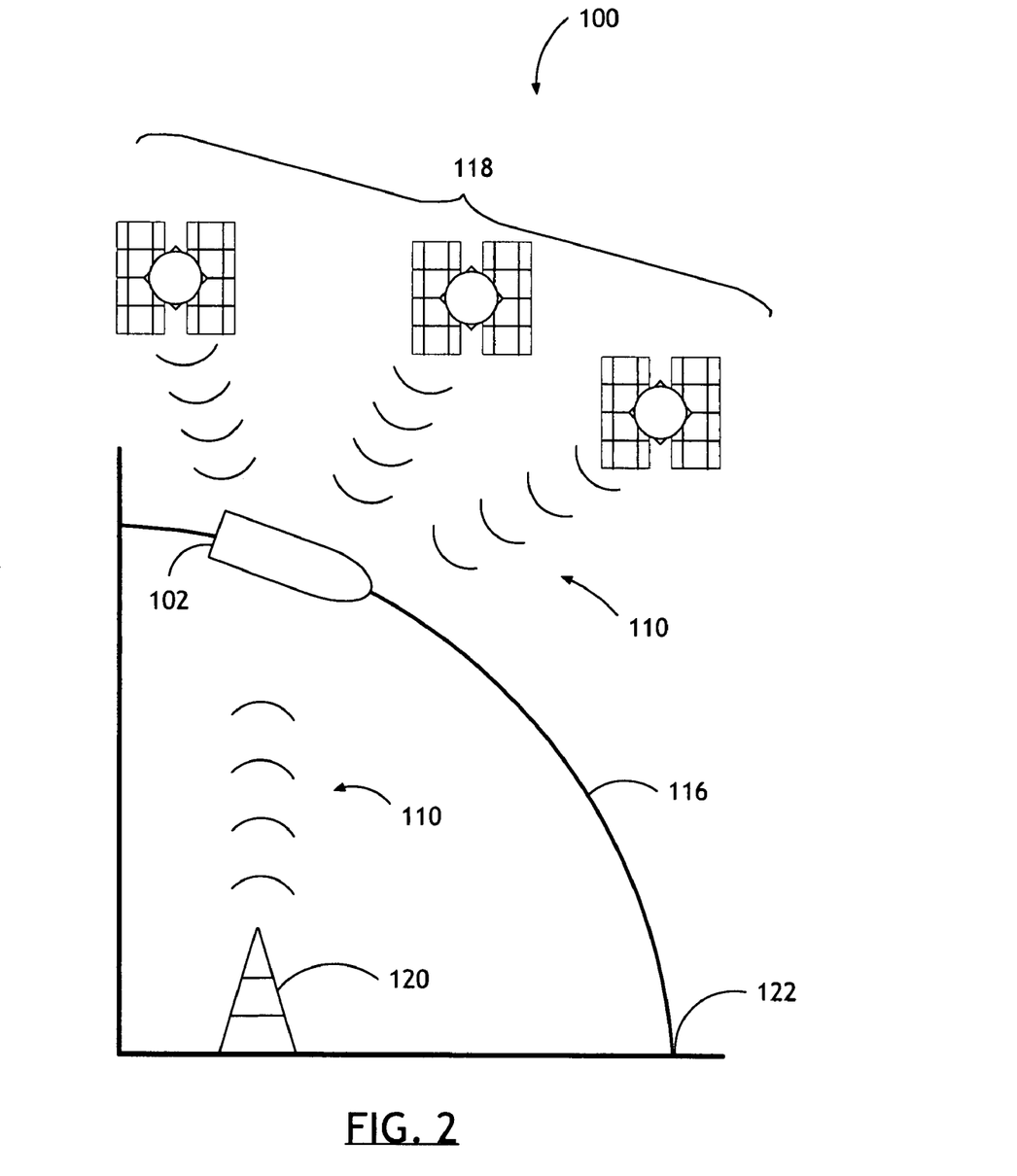
FIG. 2 is a graphical illustration showing a vehicle traveling along a flight path in accordance with an exemplary embodiment of the present invention.
Figure 3:
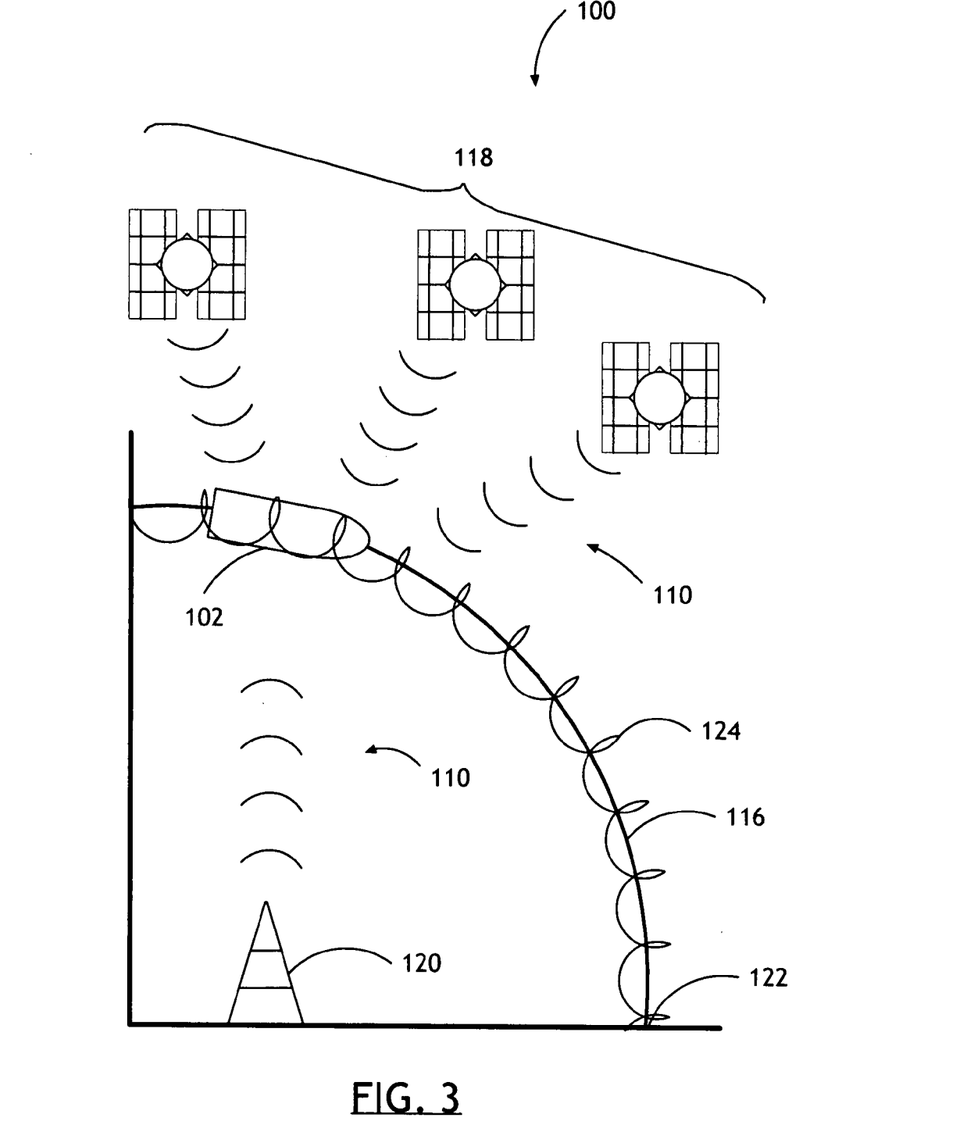
FIG. 3 is a graphical illustration showing a rotating vehicle traveling along a flight path including the path traveled by a point on the surface of the rotating vehicle in accordance with another exemplary embodiment of the present invention.

Referring generally to FIGS. 1-3, a spin rate tracking system 100 is described in accordance with exemplary embodiments of the present invention. Referring specifically to FIG. 1, a spin rate tracking system 100 in accordance with an embodiment of the present invention is shown. The spin rate tracking system 100 is implemented within a vehicle 102 and comprises a guidance system 104 and a signal reception system. Signal reception system may include a receiver 106 and an antenna 108. The guidance system 104 adjusts a vehicle flight path based on varying positional information of the vehicle 102 and the spin rate of the vehicle 102. For instance, the guidance system 104 may control one or more of the following aspects to adjust the flight path of the vehicle 102: pivotable nose-cone (i.e., a portion of the vehicle 102 can substantially and/or independently pivot relative to another portion of the vehicle 102), moveable exterior fins, rotating propellers or fans, base bleed system or other expansive gas thrust system, and the like. Alternatively the guidance system 104 may adjust the flight path based on data relayed from a source external to the vehicle 102, such as an operator-initiated signal.

In one specific embodiment, the guidance system 104 derives positional coordinates via the receiver 106 configured for receiving and/or utilizing signal information 110 from a global navigation system 112, such as a global navigation satellite system (GNSS) and/or terrestrial location system. For example, the global navigation system 112 may include the Global Positioning System (GPS), a space-based radio-navigation system managed by the United States Air Force for the Government of the United States. However, it is contemplated that the global navigation system 112 may be another radio based navigation/global positioning system, such as the GLONASS Navigation Satellite System managed by the Russian Space Agency (RSA) for the Russian Federation. Antenna 108 is also configured for receiving and/or utilizing signal information 110 from a global navigation system 112.

Additionally, in embodiments of the invention, the receiver 106 and antenna 108 may be capable of receiving and utilizing enhanced position information provided by differential GPS (DGPS) systems and wide area differential GPS (WADGPS) systems, the Wide Area Augmentation System (WAAS) provided by the Federal Aviation Administration of the United States Government, the Galileo System initiated by the European Union, and the like.

Receiver 106 is configured for acquiring and tracking a plurality of global navigation system signal sources 114. The receiver 106 may track the plurality of global navigation system signal sources 114 on a periodic, continuous, or other basis. Once tracking, the receiver 106 receives signal information 110 from the plurality of global navigation system signal sources 114. The vehicle guidance system 104 utilizes the signal information 110 (or processed positional signal information) to determine whether any adjustments in the vehicle flight path are necessary. For example, the signal information 110 is processed to provide a location in three-dimensional space, whereby the guidance system 104 incorporates this processed data along with spin rate information to determine whether adjustments in the flight path are necessary to achieve a desired flight path endpoint. Deriving the spin rate information is discussed further with respect to FIGS. 3-6.

Referring now to FIG. 2, a graphical illustration of a vehicle 102 traveling along a flight path 116 is shown, according to an exemplary embodiment of the present invention. In this embodiment, the global navigation system 112 comprises a plurality of satellite signal sources 118 and at least one terrestrial signal source 120. The plurality of satellite signal sources 118 and the at least one terrestrial signal source 120 transmit signal information 110. It is contemplated that signal information 110 may comprise a plurality of signals. For instance, signal sources, including the plurality of satellite signal sources 118 and the at least one terrestrial signal source 120, may transmit different signals of signal information 110. It may be understood that the signal information 110 is received by antenna 108 and fed to receiver 106 of FIG. 1. A vehicle guidance system, such as guidance system 104 of FIG. 1, may utilize the signal information 110 (or processed positional signal information) and spin rate information to determine whether any adjustments in the vehicle flight path 116 are necessary to reach a desired flight path end point 122. Deriving the spin rate information is discussed further with respect to FIGS. 3-6.

Referring now to FIG. 3, a graphical illustration of a rotating vehicle 102 traveling along a flight path 116 including a path traveled by a point on the surface of the rotating vehicle 124 is shown. According to an exemplary embodiment of the present invention, the path traveled by a point on the surface of the rotating vehicle 124 is the path traveled by an antenna, such as antenna 108 of FIG. 1. For instance, antenna 108 of FIG. 1 may be affixed or attached to the surface or substantially near the surface of the vehicle housing. In one embodiment of the invention, antenna 108 may be a directional antenna. It is further contemplated that antenna 108 may be a patch antenna with a stronger gain in one direction. While the vehicle 102 rotates, antenna 108 of FIG. 1 may experience the path traveled by a point on the surface of the rotating vehicle 124 as depicted in FIG. 3 or a similar travel path.

In one embodiment, antenna 108 is connected to receiver 106, for example, as illustrated in FIG. 1. Receiver 106 may comprise multiple channels dedicated for the plurality of global navigation system signals. Additionally, receiver 106 may comprise a channel for the acquisition of harmonics. The directivity of an antenna is generally controlled by a way radio frequency (RF) energy is focused in a certain direction or directions. Signals arriving from a direction in which the antenna is not sensitive will be suppressed or partially suppressed. In the exemplary embodiment of the present invention shown in FIG. 3, the directivity of an antenna, such as antenna 108 of FIG. 1, rotates with the same frequency as the vehicle 102 rotates, since antenna 108 is affixed or attached to the surface or substantially near the surface of the vehicle housing.

Figure 4A:
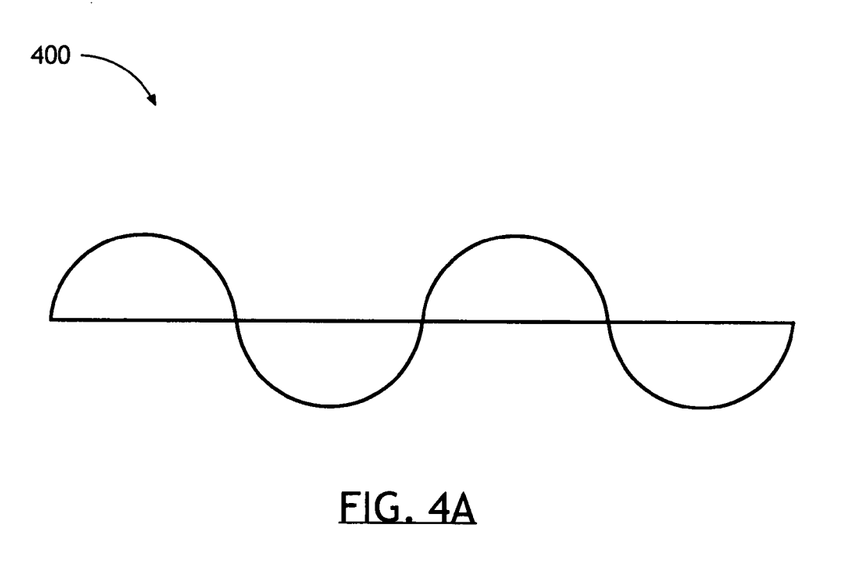
FIGS. 4A and 4B are graphical illustrations showing exemplary signal patterns produced by a directional antenna in accordance with an exemplary embodiment of the present invention.
Figure 4B:
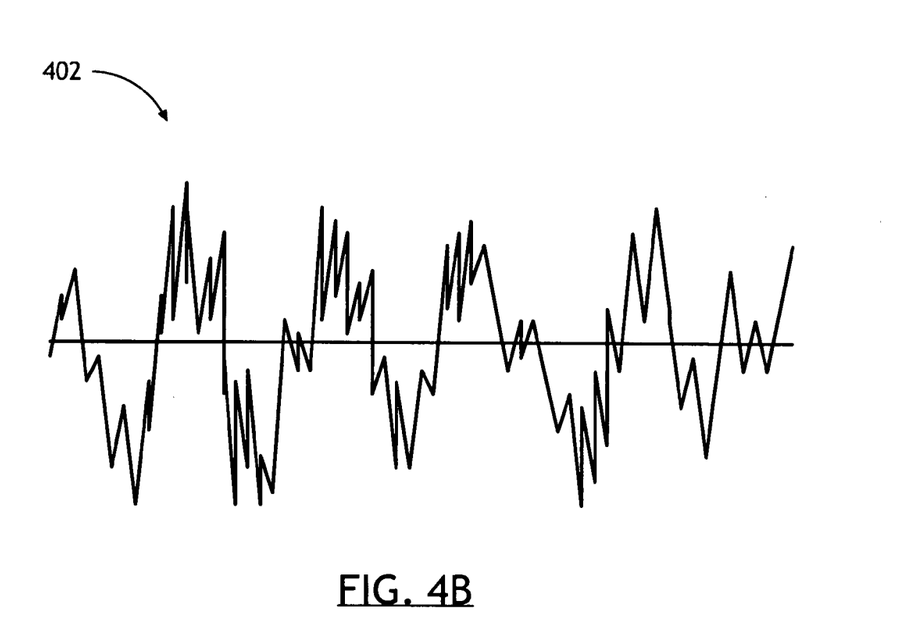

When an antenna, such as antenna 108 of FIG. 1, rotates through a signal or a series of signals, a receiver that is operably connected to the antenna 108, such as receiver 106 of FIG. 1, may acquire and/or track one of several strong frequency harmonics of the signal caused by the spinning antenna. Referring to FIGS. 4A and 4B, graphical illustrations of exemplary signal patterns 400, 402 produced by an antenna in accordance with an exemplary embodiment of the present invention are shown. For instance, the directivity of an antenna (for example, an antenna with a stronger gain in one direction), such as antenna 108 of FIG. 1, may produce harmonics, such as the exemplary harmonic pattern 400 depicted in FIG. 4A. Alternatively, the directivity of a spinning antenna may produces a substantially harmonic pattern 402, such as that depicted in FIG. 4B.

According to an exemplary embodiment of the present invention, the rotation of antenna 108 creates a harmonic pattern in the signal information 110 from the plurality of global navigation system signal sources 114 at the spin rate and integer offsets of the spin rate, or a "spin rate harmonics." The spin rate of an object refers to the revolutions per time of an object rotating about an axis. The spin rate harmonic may then be used to calculate or derive the spin rate of the vehicle 102. For instance, in one embodiment, the spin rate harmonic encompasses multiple frequencies of signal information 110 from the plurality of global navigation system signal sources 114. After acquiring a spin rate harmonic on one of a series of navigation signals, the center frequency of spin rate harmonic signal may be determined by checking for consistency against pseudorandom (PRN) code rate that is modulated on the navigation signal. In addition to correcting to the real frequency of the navigation signal, the spin rate of the vehicle 102 may be accurately determined from the difference of the tracked frequency of the spin rate harmonic and the tracked PRN code rate. For example, if the carrier frequency is used to aid the code tracking loop, the code rate term of the code tracking loop may settle on a rate which when scaled to frequency is the spin rate harmonic. The harmonic of the signal may be a multiple of the spin rate. For instance, the second harmonic would be at twice the spin rate or if two antennas are coupled together, its first harmonic would be at twice the spin rate. Because the characteristics of the harmonics will change as a function of signal geometry, if desired, the harmonic characteristic of signals from sources in multiple directions may be compared and the differences utilized to derive additional navigation information such as vehicle pointing direction or attitude. It is foreseeable in other embodiments of the present invention that multiple methods of harmonic analysis may be utilized to isolate the spin rate. These methods may include digital signal processing (DSP), discrete Fourier transform or a Fourier-related transform, eigenvector method, and the like.

In various embodiments of the present invention, antenna 108 is substantially lightweight and small relative to the vehicle 102 to conserve weight and volume of the vehicle 102. Thus, accurate spin rate data may be obtained without significant addition to vehicle weight and without significant restriction to vehicle volume. Additionally, the spin rate data is derived from signal information 110 received from the global navigation system 112, the spin rate tracking system 100 of the present invention may derive the spin rate of the vehicle 102 based on the system utilized by the guidance system 104 for determining whether adjustments in the flight path 116 are necessary for achieving a desired flight path end point 122. Thus, the spin rate tracking system 100 of the present invention avoids the systemic complexity of utilizing an independent system for deriving the spin rate, such as by inertial sensors.

Figure 5:
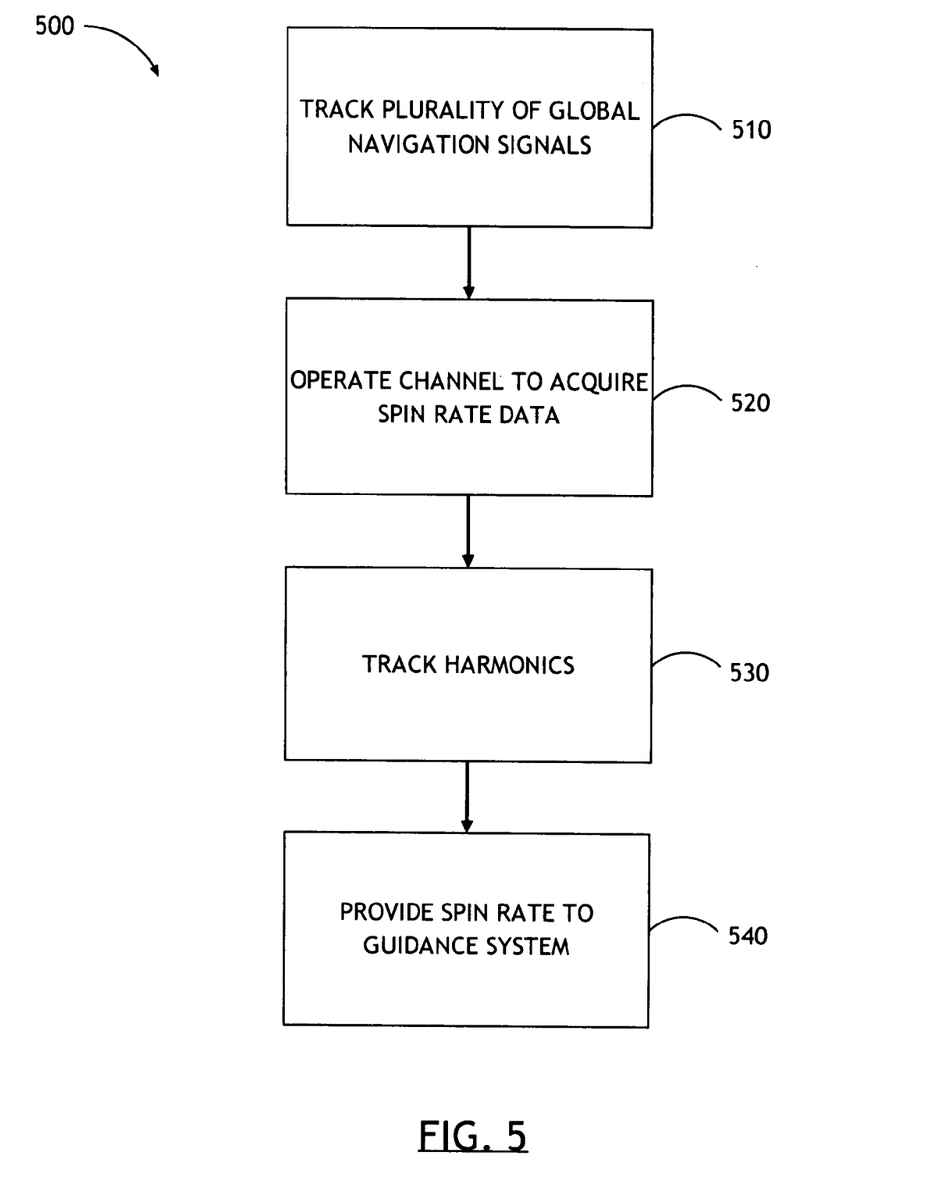
FIG. 5 is a flowchart of a spin rate tracking method in accordance with an exemplary embodiment of the present invention.

Referring now to FIG. 5, a flowchart of an exemplary spin rate tracking method 500 in accordance with an exemplary embodiment of the present invention is shown. Initially, the spin rate tracking method 500 tracks a plurality of global navigation signals 510. The spin rate tracking method 500 further operates a channel for acquisition of spin rate data 520. Additionally, the spin rate tracking method 500 tracks harmonics produced amongst global navigation signals 530. It is contemplated that tracking signals and harmonics may include the receipt of signals and harmonics and measurement of the signals and harmonics to determine position information and/or spin rate information. The spin rate tracking method 500 then provides a spin rate based on the tracking of the harmonics to a guidance system of a vehicle 540. While FIG. 5 displays the exemplary spin rate tracking method 500 as a flowchart with discrete steps, it is to be understood that FIG. 5 does not limit the order in which the steps can be completed and is displayed in the present order for exemplary purposes.

Figure 6:
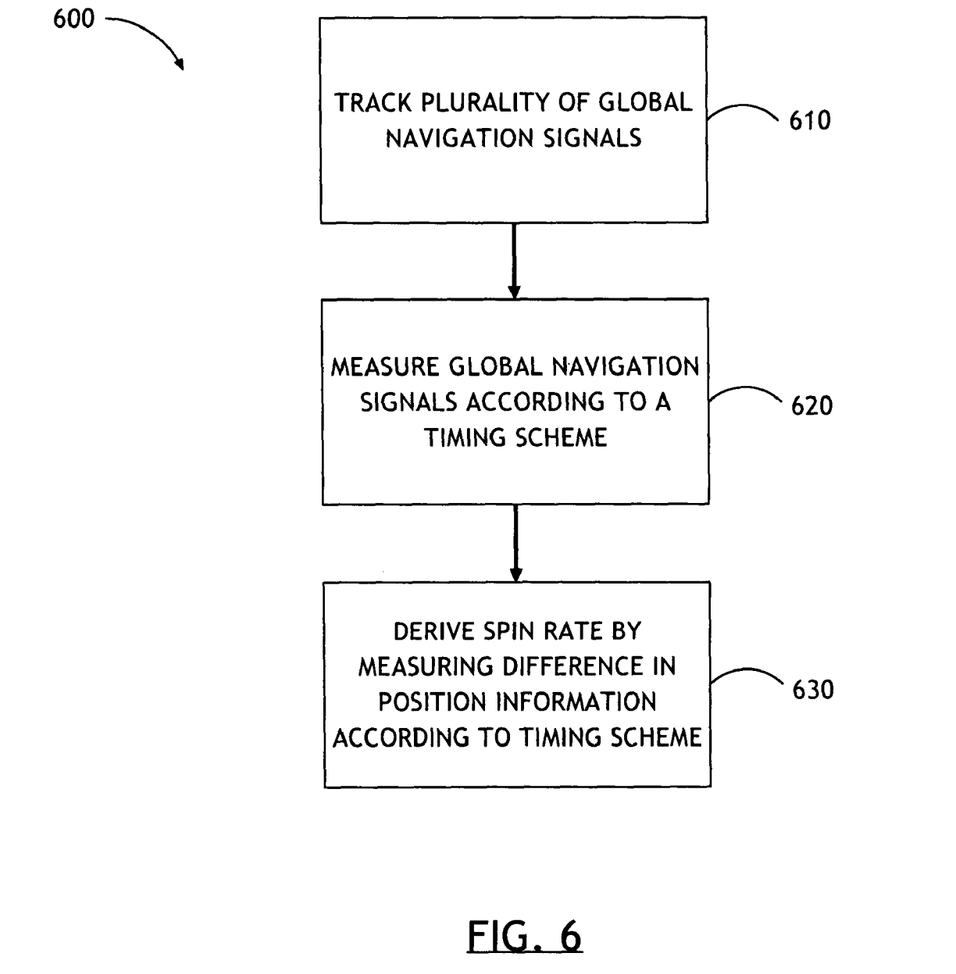
FIG. 6 is a flowchart of a spin rate tracking method in accordance with an alternative embodiment of the present invention.

Referring now to FIG. 6, a flowchart of a spin rate tracking method 600 in accordance with an alternative embodiment of the present invention is shown. A method 600 for tracking a spin rate for a vehicle may include tracking a plurality of global navigation satellite system signals 610. It is contemplated that tracking signal sources may include the receipt of signals and measurement of signals to determine position information. The method of the present invention may further comprise periodically measuring global navigation signals according to a particular timing scheme 620. For example, global navigation signals may be measured every 1 millisecond. A spin rate data of a vehicle may be derived by measuring a difference in position information according to the particular timing scheme 630. For example, utilizing position information data cross-referenced with timing data, a spin rate of a vehicle may be derived. While FIG. 6 displays the spin rate deriving tracking 600 as a flowchart with discrete steps, it is to be understood that FIG. 6 does not limit the order in which the steps can be completed and is displayed in the present order for exemplary purposes.

While it is contemplated that vehicle may be an artillery shell, missile and the like, it is contemplated that vehicle may include any device which rotates relative to a navigational signal, or any type of modulated signal. Additional examples are space vehicles, unmanned aerial vehicles and rotating antenna arrays mounted on both rotating and non-rotating vehicles. The navigation signal utilized may originate from global navigation satellite (GNSS) signals such as GPS, GLONAS or GALILEO, a ground-based or airborne radio signal source or any other type of navigation signal source such as optical or acoustic transmitters. It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A rotating vehicle spin rate tracking system, comprising:
   a guidance system suitable for adjusting a flight path of a vehicle; and
   a signal reception system configured for receiving signal information from a plurality of navigation signals, the signal reception system including an antenna and a receiver, the receiver configured to determine positional information of the vehicle and track a substantially harmonic pattern produced amongst said plurality of navigation signals, the receiver determining a spin rate of the vehicle based upon the substantially harmonic pattern produced amongst said plurality of navigation signals by periodically measuring the plurality of navigational signals according to a particular timing scheme and deriving a rotation of the vehicle according to the particular timing scheme to determine the spin rate of the vehicle, wherein said guidance system is coupled to said signal reception system and is configured to adjust the flight path of the vehicle based upon the spin rate of the vehicle and the position information of the vehicle, the guidance system configured to adjust a portion of the vehicle to adjust the flight path of the vehicle based upon the spin rate and positional information of the vehicle.

2. The system of claim 1, wherein the substantially harmonic pattern is a harmonic pattern at the spin rate of the vehicle.

3. The system of claim 1, wherein the spin rate is derived from the substantially harmonic pattern utilizing at least one digital signal processing technique executed by the receiver.

4. The system of claim 1, wherein the guidance system is configured to adjust at least one of a pivotable nose-cone, moveable exterior fins, propeller, fan, or gas thrust system to adjust the flight path of the vehicle.

5. A method for tracking a spin rate for a vehicle, the method executable by a navigation signal receiver within said vehicle, comprising;
  tracking a plurality of navigational signals;
  operating a channel for acquisition of spin rate data;
  tracking harmonics, the tracking harmonics including measuring the plurality of navigational signals according to a particular timing scheme and deriving a rotation of the vehicle according to the particular timing scheme; and
  determining a spin rate based on the tracking of the harmonics, wherein
    the spin rate is provided to a guidance system of the vehicle.

6. The method of claim 5, wherein tracking of at least one navigation signal is utilized to derive additional navigation information.

7. The method of claim 5, wherein the spin rate based upon tracking of the harmonics is accomplished by utilizing at least one digital signal processing technique.

8. The method of claim 5, wherein the navigation signal is from at least one GPS satellite.

9. A vehicle with enhanced spin rate tracking, comprising:
  a housing;
  a guidance system within the housing for adjusting the flight path of the vehicle;
  an antenna located on an exterior of the housing; and
  a GPS receiver connected to the antenna, the GPS receiver coupled to the guidance system, the GPS receiver configured to acquire and track GPS signals and determine positional information based upon said GPS signals, said GPS receiver configured to track a substantially harmonic pattern produced amongst said GPS signals, wherein the GPS receiver determines a spin rate of the vehicle based upon from the substantially harmonic pattern produced amongst the GPS signals by rotation of said antenna by periodic measurement of GPS signals according to a particular timing scheme to determine rotation of the vehicle, wherein said guidance system is coupled to said GPS receiver and is configured to adjust the flight path of the vehicle based upon the spin rate of the vehicle and the positional information of the vehicle, the guidance system configured to adjust a portion of the vehicle to adjust the flight path of the vehicle based upon the spin rate and positional information of the vehicle.

10. The vehicle of claim 9, wherein the substantially harmonic pattern is a harmonic pattern at the spin rate of the vehicle.

11. The vehicle of claim 9, wherein the guidance system is configured to adjust the flight path of the vehicle based on the positional information of the vehicle produced by the GPS receiver.

12. The vehicle of claim 11, wherein a channel of said plurality of channels of said GPS receiver is utilized for tracking said substantially harmonic pattern.

13. The vehicle of claim 9, wherein said GPS receiver includes a plurality of channels.

14. The vehicle of claim 9, wherein the guidance system is configured to adjust at least one of a pivotable nose-cone, moveable exterior fins, propeller, fan, or gas thrust system to adjust the flight path of the vehicle.

* * * * *